United States Patent [19]

Geisler et al.

[11] Patent Number: 4,917,919
[45] Date of Patent: Apr. 17, 1990

[54] PROCESS FOR PREVENTING CAKING OF AMMONIUM BIFLUORIDE AND/OR FLUORIDE PARTICLES

[75] Inventors: Klaus Geisler, Bergisch Gladbach; Dorde Jovcic, Burscheid; Bernd Krumbach, Leverkusen; Heinz Heumüller, Cologne, all of Fed. Rep. of Germany

[73] Assignee: Bayer Aktiengesellschaft, Leverkusen, Fed. Rep. of Germany

[21] Appl. No.: 217,501

[22] Filed: Jul. 11, 1988

[30] Foreign Application Priority Data

Jul. 30, 1987 [DE] Fed. Rep. of Germany ....... 3725285

[51] Int. Cl.$^4$ ................................................ B05D 7/00
[52] U.S. Cl. ..................................... 427/220; 252/384; 427/421
[58] Field of Search ................... 427/220, 421; 252/384

[56] References Cited

U.S. PATENT DOCUMENTS

| 3,740,346 | 6/1973 | Sarrade-Loucher | 252/384 |
| 3,926,841 | 12/1975 | Habanko et al. | 252/384 |
| 4,001,378 | 1/1977 | Jasnosz | 423/268 |
| 4,490,281 | 12/1984 | James et al. | 252/384 |

FOREIGN PATENT DOCUMENTS 53-38668  3/1978  Japan ................................ 252/384

OTHER PUBLICATIONS

Ullman, (4) 11, pp. 621–624.
Winnacker-Kuchler (3) 2, pp. 512–514.
Ullman, (4) 23, pp. 322–323.
Kirk-Othmer, 19, pp. 608–614.
Kirk-Othmer, (3) 14, p. 377.

*Primary Examiner*—Stanley Silverman
*Attorney, Agent, or Firm*—Sprung Horn Kramer & Woods

[57] ABSTRACT

A process for preventing the caking of particles of ammonium bifluoride and/or ammonium fluoride salt mixtures or salts subjected to the action of temperature, pressure and/or moisture, the process comprising spraying on said particles a solution comprising a primary, secondary or tertiary amine carrying an alkyl group with 8 to 25 carbon atoms.

11 Claims, No Drawings

PROCESS FOR PREVENTING CAKING OF AMMONIUM BIFLUORIDE AND/OR FLUORIDE PARTICLES

BACKGROUND OF THE INVENTION

1. Field of the Invention

This invention relates to a process for preventing caking of ammonium bifluoride and/or ammonium flourids, whose particles readily cake together under the effect of temperature, pressure and water vapor.

2. Background Information

Ammonium bifluoride/fluoride (commercial mixture of $NH_4HF_2$ and $NH_4F$) is produced industrially by the reaction of gaseous ammonia and hydrogen fluoride. Scales, pastilles and granules can be produced from the solidified melt with suitable apparatus. It is also known that ammonium bifluoride/fluoride salt mixtures can be obtained from aqueous solutions by crystallization and filtration followed by drying (Ullmann, (4) 11, page 621). These products have the disadvantage that in storage they tend to cake and/or clump together when subjected to pressure, e.g., when sacks of the product are stacked on pallets, or to temperature, e.g., during prolonged storage in regions with a high annual average temperature, and/or to moisture. In extreme cases, the packaged product may harden to an agglomerate which must then be broken down again into a pourable, fine grained product by mechanical means or discarded as completely unusable.

It has already been attempted to solve the aforementioned means of additives. It has long been known that inorganic additives such as kieselguhr (Winnacker-Küchler, (3) 2, page 512), Clay (Ullmann, (4) 23, page 322), various types of talc (Kirk-Othmer, 19, pages 608 to 614) and/or calcium carbonate (Kirk-Othmer, (3) 14, page 377) can be used as anticaking and fluidizing agents for ammonium compounds, but they must be used in relatively large quantities (1 to 5% by weight) and have the disadvantage that they prevent caking which is only due to moisture. Such additives have no effect against the action of pressure and temperature. Another disadvantage of these additives is that since they are virtually insoluble in water, they interfere with process steps involving crystallization of a product from aqueous solutions and in some cases even react with the salts, e.g., with ammonium bifluoride. Thus when kieselguhr is added to ammonium bifluoride solutions, for example, toxic gaseous $SiF_4$ is released, and when calcium compounds are added they bind fluoride and thereby reduce the yield of ammonium bifluoride.

It is also known that ammonium compounds can be prevented from caking and clumping together by the addition of dyes. GB Pat. Nos. 625 077; 665 478 and 743 602 describe the addition of aniline red to ammonium salts. This dye has, however, the disadvantage that it is active only at low temperatures, at which the tendency to caking is in any case less marked. Further, it produces an intense color in the treated material.

The problem therefore existed of providing anti-caking agents and a process by which ammonium bifluoride and/or fluoride salt mixtures and salts could be modified with these anti-caking agents so that the salt or salt mixture would not agglomerate to clumps even when stored at elevated ambient temperatures and under the action of pressure and/or moisture and would remain in a loose, pourable state as crystals, scales, pastilles or granules.

SUMMARY OF THE INVENTION

The present invention relates to anti-caking agents for preventing the caking together or particles of ammonium bifluoride and/or ammonium fluoride salt mixtures or salts under the action of temperature, pressure and/or moisture. The agents of the present invention contain primary, secondary or tertiary amines carrying alkyl groups with 8 to 24 carbon atoms, in particular, fatty amines. The anti-caking agent is preferably sprayed on the solid as a solution, preferably with an active ingredient content of from 5 to 50% by weight, in particular 10 to 30% by weight. Fluorochlorohydrocarbons have proved to be suitable solvents for this purpose. According to a preferred embodiment of the invention, the solution is applied as a finely atomized spray in which the droplet sizes should be as far as possible homogeneous and in the range of from 1 to 100 $\mu$m, preferably from 5 to 50 $\mu$m. The solution is advantaeously injected directly into the stream of product which is transported pneumatically. The quantity of anti-caking agent on the salt is preferably from 0.005 to 0.2% by weight, most preferably from 0.01 to 0.1% by weight, based on the $NH_4HF_2$ and/or $NH_4F$.

DETAILED DESCRIPTION OF THE INVENTION

The amines according to the invention which contain $C_8$ to $C_{25}$ alkyl groups and are selected from primary, secondary and tertiary amines have surprisingly been found to be highly active anti-caking agents for ammonium bifluoride and/or fluoride. Primary amines having a chain length of $C_{14}$ to $C_{20}$ and/or mixtures thereof are preferably used.

For the purpose of obtaining uniform distribution of the anti-caking agent on the solid which is to be treated, it has been found advantageous to dilute the agent before application. Various solvents may be used for this dilution, but inert fluorocholorhydrocarbons in which the amines according to the invention readily dissolve have proved to be particularly suitable.

The anti-caking agents are preferably contained in the solution at a concentration of 5 to 50% by weight, in particular 10 to 30% by weight. The solutions may be prepared at various temperatures. If the temperature exceeds the boiling point of the solvent, the solution may be prepared at an elevated pressure. It has been found particularly advantageous, also for the purpose of optimum distribution on the salt after spraying, to mix the anti-caking agent with the solvent at a temperature of about 50° to 60° C.

For optimum effect of the anti-caking agent, it is advantageous to spray the agent uniformly in a finely atomized form as a 5 to 50% by weight solution, preferably a 10 to 30% by weight solution, for example in 1,1,2,1,2,2-trifluorotrichloroethane as a solvent. It has been found advantageous to atomize the solution by means of a one-material nozzle into the pneumatically conveyed product stream of crystals, granules, scales or pastilles. For obtaining uniform distribution of the anti-caking agent on the surface of the solid particles it is also advantageous to ensure that the agent is in the form of finely divided droplets, both in order that they may be rapidly deposited and in order to prevent loss of droplets by discharge from the mixing station with the stream of product. In the process according to the invention, therefore, the solution is advantageously atomized to droplets measuring 1 to 100 μm in diameter, preferably 5 to 50 μm, as this ensures uniform distribution of the anti-caking agent on the surface of the $NH_4HF_2$ and/or $NH_4F$, as well as ensuring that the droplets will not be carried out of the mixing station with the stream of air which is necessary for pneumatically transporting the crystals, granules, pastilles or scales of ammonium bifluoride and/or fluoride. A narrow size distribution of the droplets obtained by atomization is also advantageous.

The invention is illustrated by way of example in the following examples, but is not limited to these examples.

EXAMPLE 1

Commercial ammonium bifluroide scale which in the present case consist of about 98% by weight of $NH_4HF_2$ and about 2% by weight of $NH_4F$ are sprayed with a 15% by weight solution of octadecylamine in 1,1,2,1,2-trifluorotrichloroethane so that 0.05% by weight of the amine, based on the salt mixture, is applied to the scales. Spraying of the anti-caking agent is carried out with a one-material nozzle having a bore of such a size that a spray mist with an average droplet diameter of 20 μm is produced under a preliminary pressure of 8 bar. This mist is applied to the commercial ammonium bifluoride scales.

The treated ammonium bifluoride/fluoride scales are stored for 28 days at 40° C. and a relative humidity of 90% in packages which are permeable to water vapor.

The scales are still free flowing at the end of this storage period.

COMPARISON EXAMPLe 1

Untreated ammonium bifluoride scales having the sam analytical composition as in Example 1 are stored under analogous conditions. The scale cake together to a solid clump within 4 days.

EXAMPLE 2

Ammonium bifluoride having the same analytical composition as in Example 1, but in the form of pastilles is treated with oleylamine in the form of a 20% by weight solution in 1,1,2,1,2-trifluorotrichloroethane to produce a concentration of 0.04% by weight on these pastilles, based on the quantity of the salt. These pastilles, packed in 25 kg sacks stacked on pallets to a height of 130 cm, are kept for 24 hours in a climatic chamber at 70° C. and 40% relative humidity. No caking occurs and the material remains free flowing.

COMPARISON EXAMPLE 2

Salt which is stored under the same conditions as in Example 2, but has not been sprayed, cakes to a rock hard agglomerate within 24 hours.

It will be appreciated that the instant specification and claims are set forth by way of illustration and not limitation, and the various modifications and changes may be made without departing from the spirit and scope of the present invention.

What is claimed is:

1. A process for preventing the caking of particles of ammonium bifluoride and/or ammonium fluoride salt mixtures, the process comprising spraying a solution on said particles, said solution consisting essentially of (a) a solvent, said solvent being a fluorochlorohydrocarbon, and (b) a primary, secondary or tertiary amine carrying an alkyl group with 8 to 25 carbon atom, the amine being in a concentration of 0.005 to 0.2% by weight, based on the ammonium bifluoride and/or ammonium fluoride.

2. A process according to claim 1, wherein that the amine content of the solution is from 5 to 50% by weight.

3. A process according to claim 1, wherein that the amine content of the solution is from 10 to 30% by weight.

4. A process according to claim 1, wherein the solvent is 1,1,2,1,2-trifluorotricholoroethane.

5. A process according to claim 1, wherein the solution is applied to the particles by a very finely divided and homogeneous atomization having droplets with diameters of from 1 to 100 μm.

6. A process according to claim 1, wherein the solution is applied to the particles by a very finely divided and homogeneous atomization having droplets with diameters of from 5 to 50 μm.

7. A process according to claim 1, wherein the solution is applied by atomization of the solution onto a pneumatically transported stream of said particles.

8. A process according to claim 1, wherein the concentration of the amine applied to the particles is from 0.01 to 1.1% by weight, based on the ammonium bifluoride and/or ammonium fluoride.

9. A process according to claim 1, wherein said amine is a fatty amine.

10. A process according to claim 1, wherein the solution comprises one or more primary amines having 14 to 20 carbon atoms.

11. A process according to claim 1, wherein the amine and the solvent are mixed at a temperature of 50° C. to 60° C.

* * * * *

UNITED STATES PATENT AND TRADEMARK OFFICE
CERTIFICATE OF CORRECTION

PATENT NO. : 4,917,919

DATED : April 17, 1990

INVENTOR(S) : Geisler et al.

It is certified that error appears in the above-identified patent and that said Letters Patent is hereby corrected as shown below:

Title Page     U.S. PATENT DOCUMENTS: After " 3,926,841, 12/1975 " delete " Habanko " and substitute -- Habasko --

Title Page     FOREIGN PATENT DOCUMENTS: Delete " 53-38668 " and substitute -- 53-8668 --

Signed and Sealed this

Fifth Day of November, 1991

*Attest:*

HARRY F. MANBECK, JR.

*Attesting Officer*     *Commissioner of Patents and Trademarks*